(12) United States Patent
Harirchi et al.

(10) Patent No.: US 12,508,939 B2
(45) Date of Patent: Dec. 30, 2025

(54) BIDIRECTIONAL ELECTRIC VEHICLE CHARGING SYSTEM

(71) Applicant: FORD GLOBAL TECHNOLOGIES, LLC, Dearborn, MI (US)

(72) Inventors: Farshad Harirchi, Ann Arbor, MI (US); Ryan O'Gorman, Beverly Hills, MI (US); Hossein Sartipizadeh, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 851 days.

(21) Appl. No.: 17/747,026

(22) Filed: May 18, 2022

(65) Prior Publication Data
US 2023/0406147 A1    Dec. 21, 2023

(51) Int. Cl.
| | |
|---|---|
| *H02J 7/00* | (2006.01) |
| *B60L 53/57* | (2019.01) |
| *B60L 53/68* | (2019.01) |
| *B60L 55/00* | (2019.01) |
| *H02J 3/32* | (2006.01) |

(52) U.S. Cl.
CPC ............... *B60L 53/68* (2019.02); *B60L 53/57* (2019.02); *B60L 55/00* (2019.02); *H02J 3/32* (2013.01); *H02J 7/00* (2013.01)

(58) Field of Classification Search
None
See application file for complete search history.

(56) References Cited

U.S. PATENT DOCUMENTS

| | | | |
|---|---|---|---|
| 6,104,160 A | 8/2000 | Iwata et al. | |
| 8,581,545 B2 | 11/2013 | Obayashi et al. | |
| 9,083,193 B2 | 7/2015 | Obayashi et al. | |
| 9,713,962 B2 * | 7/2017 | Payne | B60L 53/62 |
| 9,840,156 B2 * | 12/2017 | DeBoer, III | B60L 53/64 |
| 9,878,629 B2 * | 1/2018 | Lowenthal | B60L 53/65 |
| 10,882,411 B2 * | 1/2021 | Yang | B60L 58/13 |

(Continued)

FOREIGN PATENT DOCUMENTS

| | | | | |
|---|---|---|---|---|
| CN | 104701874 A | * | 6/2015 | ............... H02J 3/381 |
| CN | 105490363 A | * | 4/2016 | ............ H02J 7/0068 |

(Continued)

OTHER PUBLICATIONS

Kikusato et al., "Electric Vehicle Charge-Discharge Management for Utilization of Photovoltaic by Coordination Between Home and Grid Energy Management Systems", May 2017, IEEE Transactions On Smart Grid, vol. 10, No. 3, May 2019. (Year: 2017).*

(Continued)

*Primary Examiner* — Mohammad Ali
*Assistant Examiner* — Kelvin Booker
(74) *Attorney, Agent, or Firm* — David B. Kelley; Brooks Kushman P.C.

(57) ABSTRACT

One or more controllers may, responsive to a request from a first vehicle to receive a predefined amount of charge power by a specified time, query the first vehicle regarding whether the first vehicle will accept an amount of charge power less than the predefined amount by the specified time, (Continued)

and command a grid and a local controller to each supply charge power to the first vehicle such that the first vehicle receives the amount of charge power less than the predefined amount by the specified time.

15 Claims, 6 Drawing Sheets

(56) References Cited

U.S. PATENT DOCUMENTS

| | | | | |
|---|---|---|---|---|
| 10,994,625 | B2* | 5/2021 | Okumura | B60L 53/51 |
| 11,524,601 | B2 | 12/2022 | Yu et al. | |
| 12,172,542 | B2* | 12/2024 | Dow | G06Q 50/06 |
| 2009/0313033 | A1* | 12/2009 | Hafner | G07F 15/008 |
| | | | | 705/1.1 |
| 2010/0017045 | A1* | 1/2010 | Nesler | B60L 53/665 |
| | | | | 700/295 |
| 2011/0133693 | A1* | 6/2011 | Lowenthal | B60L 53/65 |
| | | | | 320/109 |
| 2014/0006137 | A1* | 1/2014 | Melen | G06Q 10/1093 |
| | | | | 705/14.35 |
| 2018/0254732 | A1* | 9/2018 | Smolenaers | H02J 1/12 |
| 2019/0039467 | A1* | 2/2019 | Hortop | H02J 7/0071 |
| 2021/0061121 | A1* | 3/2021 | Light-Holets | B60L 55/00 |
| 2021/0138928 | A1* | 5/2021 | O'Gorman | B60L 50/50 |
| 2022/0097551 | A1* | 3/2022 | Dow | B60L 53/68 |
| 2022/0097558 | A1* | 3/2022 | Dow | B60L 58/12 |

FOREIGN PATENT DOCUMENTS

| | | | | |
|---|---|---|---|---|
| CN | 106611886 A | * | 5/2017 | B60L 58/10 |
| CN | 106787039 B | * | 7/2019 | H02J 7/0027 |
| CN | 107264308 B | * | 3/2020 | B60L 53/31 |
| CN | 210502289 U | * | 5/2020 | B60L 5/28 |
| DE | 10258204 A1 | * | 2/2004 | B60L 58/40 |
| EP | 3974243 A1 | * | 3/2022 | H04W 4/44 |
| JP | 6552769 B1 | * | 7/2019 | B60L 50/64 |
| JP | 2021016243 A | * | 2/2021 | H02J 7/0027 |
| KR | 20140068384 A | * | 6/2014 | H02J 3/381 |
| TW | M572323 U | * | 1/2019 | H02J 7/0027 |
| WO | WO-2008015886 A1 | * | 2/2008 | B60L 50/61 |

OTHER PUBLICATIONS

Verma et al., "Bi-Directional Charger for Electric Vehicle with Four Quadrant Capabilities", 2016, IEEE. (Year: 2016).*

Zhou et al., "Multi-Function Bi-directional Battery Charger for Plug-in Hybrid Electric Vehicle Application", 2009, IEEE. (Year: 2009).*

Pinto et al., "Bidirectional Battery Charger with Grid-to-Vehicle, Vehicle-to-Grid and Vehicle-to-Home Technologies", 2013, IEEE. (Year: 2013).*

Hadian et al., "Optimal Allocation of Electric Vehicle Charging Stations With Adopted Smart Charging/Discharging Schedule", Oct. 2020, IEEE Access. (Year: 2020).*

Alahyari et al., "Incorporating Customer Reliability Cost in PEV Charge Scheduling Schemes Considering Vehicle-to-Home Capability", Jul. 2015, IEEE Transactions On Vehicular Technology, vol. 64, No. 7. (Year: 2015).*

Mukherjee et al., "A Review of Charge Scheduling of Electric Vehicles in Smart Grid", Dec. 2015, IEEE Systems Journal, vol. 9, No. 4. (Year: 2015).*

Nguyen et al., "Joint Optimization of Electric Vehicle and Home Energy Scheduling Considering User Comfort Preference", Jan. 2014, IEEE Transactions On Smart Grid, vol. 5, No. 1. (Year: 2014).*

Pal et al., "Electric Vehicle Scheduling Strategy in Residential Demand Response Programs With Neighbor Connection", Mar. 2018, IEEE Transactions On Industrial Informatics, vol. 14, No. 3. (Year: 2018).*

Sangswang et al., "Optimal Strategies in Home Energy Management System Integrating Solar Power, Energy Storage, and Vehicle-to-Grid for Grid Support and Energy Efficiency", 2020, IEEE Transactions On Industry Applications, vol. 56, No. 5. (Year: 2020).*

Tushar et al., "Smart Microgrids: Optimal Joint Scheduling for Electric Vehicles and Home Appliances", Jan. 2014, IEEE Transactions On Smart Grid, vol. 5, No. 1. (Year: 2014).*

Kikusato et al., "Electric Vehicle Charge-Discharge Management for Utilization of Photovoltaic by Coordination Between Home and Grid Energy Management Systems", May 2019, IEEE Transactions On Smart Grid, vol. 10, No. 3. (Year: 2019).*

Kamankesh et al., "Optimal scheduling of renewable micro-grids considering plug-in hybrid electric vehicle charging demand", Aug. 2015, Energy 100 (2016) 285e297. (Year: 2015).*

Ito et al., "Model Predictive Charging Control of In-Vehicle Batteries for Home Energy Management Based on Vehicle State Prediction", Jan. 2018, IEEE Transactions On Control Systems Technology, vol. 26, No. 1. (Year: 2018).*

Hamid et al., "Distributed Recharging Rate Control for Energy Demand Management of Electric Vehicles", Aug. 2013, IEEE Transactions On Power Systems, vol. 28, No. 3. (Year: 2013).*

He et al., "Optimal Scheduling for Charging and Discharging of Electric Vehicles", Sep. 2012, IEEE Transactions On Smart Grid, vol. 3, No. 3. (Year: 2012).*

Elgamal et al., "Day-ahead complex power scheduling in a reconfigurable hybrid-energy islanded microgrid with responsive demand considering uncertainty and different load models", 2022, Applied Energy 309 (2022) 118416 (Year: 2022).*

* cited by examiner

BIDIRECTIONAL ELECTRIC VEHICLE CHARGING SYSTEM

TECHNICAL FIELD

The present disclosure relates to a system for controlling and coordinating bidirectional electric charge transfer to and from an electric vehicle.

BACKGROUND

Electric vehicles may include a rechargeable high-capacity vehicle battery to provide power to the propulsion system as well as other vehicle systems. The vehicle battery may be discharged to supply power to devices outside the vehicle. For instance, the electric vehicle may supply power to a building and/or transfer power back to the grid.

SUMMARY

A server includes one or more controllers that receive data from a first vehicle at a location, and receive data from a local controller about a second vehicle that is at the location and not in communication with the one or more controllers, that, responsive to a request from the first vehicle to receive a predefined amount of charge power by a specified time, query the first vehicle regarding whether the first vehicle will accept an amount of charge power less than the predefined amount by the specified time, and that command a grid and the local controller to each supply charge power to the first vehicle based on the data from the first vehicle and the data from the local controller such that the first vehicle receives the amount of charge power less than the predefined amount by the specified time.

A server includes one or more controllers that, responsive to indication of a first vehicle at a location having an amount of stored power that is greater than an amount of power needed to satisfy power demand of the first vehicle over a predefined period of time, command the first vehicle to discharge at least some of the stored power to a grid, and command a local controller at the location to subsequently charge the first vehicle with power renewably generated at the location based on data about anticipated use of the first vehicle and weather data at the location for the predefined period of time.

A home energy system includes a local controller that accesses data from a first vehicle at a location describing a schedule of use of the first vehicle for a predefined period of time, and responsive to a request from a second vehicle at the location to receive an amount of charge power by a specified time while data from the second vehicle describing a scheduled use of the second vehicle for the predefined period of time is unavailable to the local controller, command at least one of a grid or a local energy storage at the location to provide the amount of charge power by the specified time based on the schedule of use of the first vehicle and the request.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure proposes a system for coordinating electric energy transfer between various entities that include an electric vehicle. More specifically, the entities may further include a home energy ecosystem (HEE).

Figure 1:
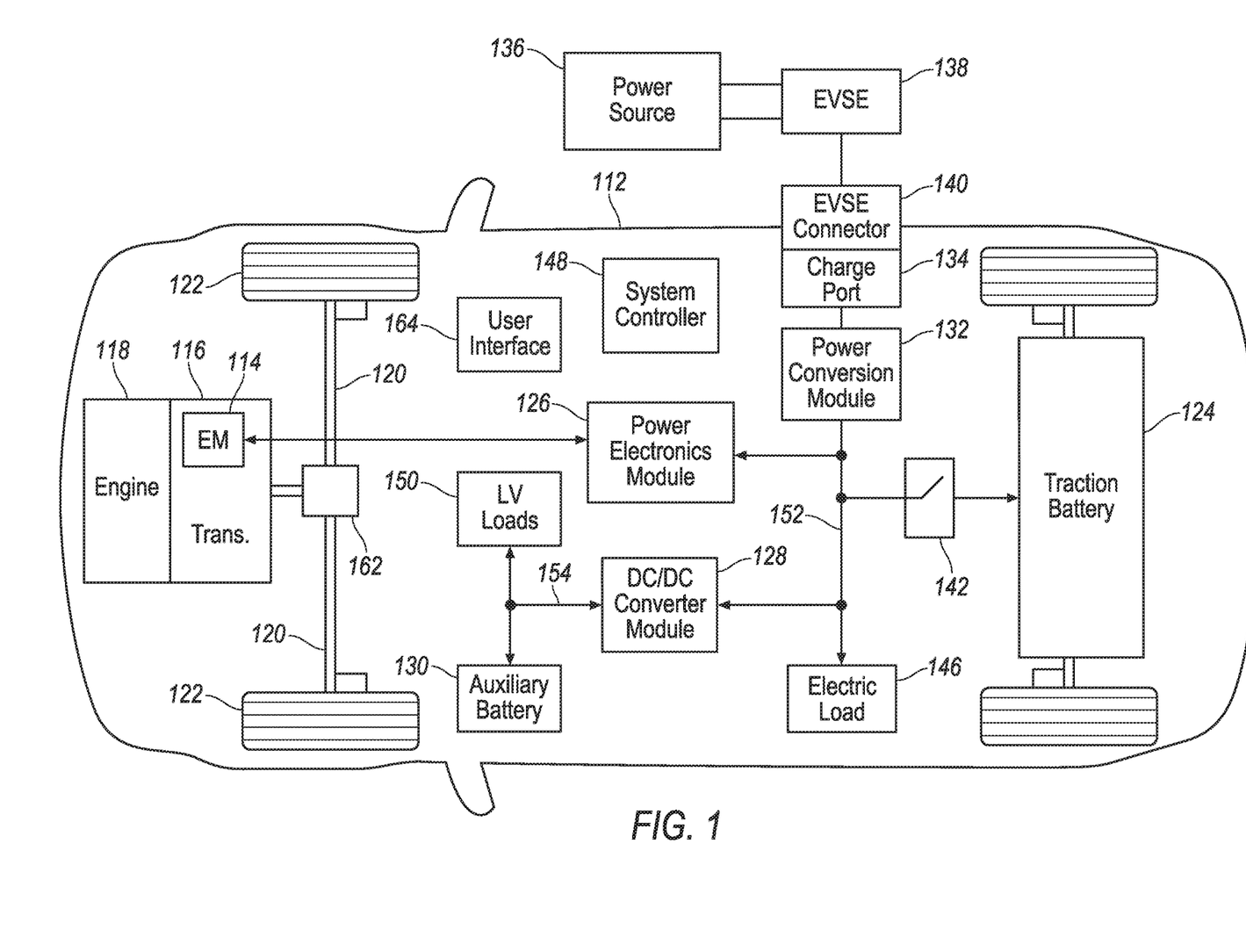
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a Battery Electric Vehicle (BEV). In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g. 12V battery) for charging the auxiliary battery 130. The low-voltage systems may be electrically coupled to the auxiliary battery 130. One or more electrical loads 146 may be coupled to the high-voltage bus/rail. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling. Additionally, the vehicle 112 may be configured to provide electric power from the traction battery 124 to off-board power storage and/or a power grid (not shown) via the EVSE 138 and EVSE connection 140 under the control of local controllers or one or more remote controllers such as a cloud server (not shown). Alternatively, the power transfer from the traction battery 124 to the off-board load (e.g. the home energy storage (HES)) may be performed without utilizing the power conversion module 132 since both the traction battery 124 and the HES are DC power. Transferring from the traction battery 124 to the power grid may require utilizing the power conversion module 132 as the power grid may be on AC power only. The traction battery 124 may be directly connected to the charge port to transfer and/or receive DC power. For instance, the EVSE 138 may be integrated or associated with a home having a HES as power backup. The vehicle 112 may be operated as a portable power storage to transfer power from and to the HES coordinated by a controller (to be described in detail below).

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by the Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g. Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
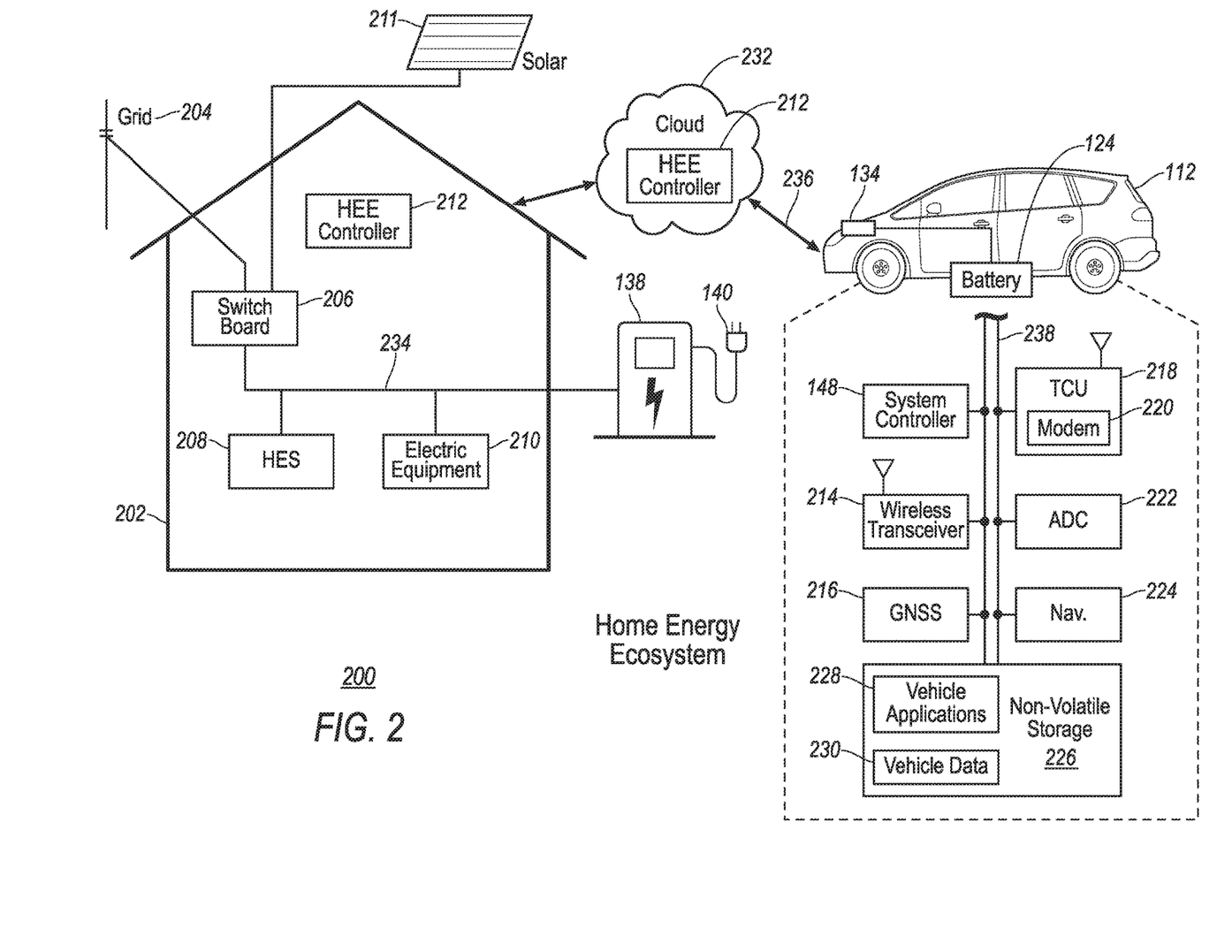
FIG. 2 is a diagram of a home energy ecosystem associated with an electric vehicle.

FIG. 2 depicts a diagram of a home energy management system associated with an electric vehicle. A home energy ecosystem (HEE) 200 in the present example may be implemented for a house/building 202. The house 202 may access electric power from a power grid 204 via a switch board 206 configured to provide various components of the HEE 200 with electric power via an internal powerline 234. For instance, the HEE 200 may include one or more electric equipment 210 (e.g. appliance) configured to consume electricity and provide various features to the household. The HEE 200 may further include a HES 208 configured to store electric energy. The HES 208 may be implemented in various forms. As an example, the HES 208 may include a rechargeable battery (e.g. lithium-ion battery) to store electric energy received from the grid 204 (or other sources) and to provide the electric energy to the internal powerline 234 whenever needed. Since the electric energy may be stored as DC power in the HES 208, one or more DC/AC inverters may be provided with the HES 208 for power transitions. The house 202 may be further connected to a regenerative energy source such as solar panel 211 via the switch board 206. The solar panel 211 may be configured to generate and supply electric power to the HES 208 via the internal power line 234. The solar panel 211 may generate a DC electric power having a voltage that is the same or different from the voltage of the HES 208. In one example, the solar panel 211 may be configured to charge the HES 208 via one or more DC/DC converters. Alternatively, one or more DC/AC inverters may be provided with the solar panel 211 and/or the switch board for power transitions. It is noted that although the solar panel 211 is provided to the house 202 for electric power generating in the present embodiment, the present disclosure is not limited thereto. In other words, the house 202 may be provided with other means of power generating capabilities such as a wind, turbine or the like. It is further noted that the term grid is used as a general term in the present disclosure and may involve various entities associated with energy transactions. For instance, the grid 204 may include a power plant generating electricity, a utility company distributing electricity, a microgrid entity generating and distributing electricity in a discrete manner, and/or other entities generating, distributing and consuming electricity.

With continuing reference to FIG. 1, the internal powerline 234 may be further connected to an EVSE 138 configured to transfer electric energy with one or more electric vehicles 112. For simplicity purposes, only one electric vehicle 112 is illustrated in FIG. 2. The EVSE 138 may be installed within or near the house 202 (e.g. in a garage) and adapted to a home electric energy configuration having a predefined voltage and maximum current supported by the switch board 206. As discussed with reference to FIG. 1, the EVSE 138 may be configured to connect to the vehicle 112 via the charge port 134 to charge the traction battery 124. Additionally, the EVSE 138 may be further configured to draw electric power from the traction battery 124 of the vehicle 112 to supply power to the HEE 200 or the grid 204. For instance, in case of a power outage or shortage from the grid 204, the EVSE 138 may be configured to draw electric power from the vehicle 112 to power the components of the house 202. Additionally or alternatively, the EVSE 138 may be configured to draw electric power from the solar panel 211, the HES 208 and/or the traction battery 124 to supply power to the grid 204.

The power management of the HEE 200 may be controlled and coordinated by a local HEE controller 209 associated with house 202. The local HEE controller 209 may be implemented in various manners. For instance, the local HEE controller 209 may be a dedicated controller located within the house 202 and connected to components of the home energy ecosystem or smart home devices HEE 200 via wired or wireless connections (not shown). Alternatively, a remote HEE controller 212 may be implemented via a cloud server through the Internet and configured to remotely monitor and control the operations of components of the HEE 200. In any or all of the above implementation examples, the HEE controllers 209, 212 may be provided with software to monitor and control the operations of the various components of the home energy ecosystem HEE 200. The HEE controllers 209, 212 may be further provided with an interface associated with input and output devices to interact with a user of the HEE 200. The local HEE controllers 209 may be further connected to a cloud 232 via a public or private network to communicate with other entities such as the utility company and weather agencies to facilitate the planning and controlling of the HEE 200. In an alternative example, the remote HEE controller 212 may be implemented via the cloud server 232 through software without dedicated hardware structure for the house 202. It is noted that the term cloud 232 recited in the present disclosure is used as a general term and may include any computing network involving carriers, router, computers, controllers, circuitries, servers or the like configured to store data and perform data processing functions and facilitate communication between various entities.

With continuing reference to FIG. 1, the vehicle 112 may further include various components to facilitate the power transaction between the battery 124 of one or more vehicles 112, the EVSE 138 and the grid 204. The vehicle 112 may include a system controller 148 configured to perform instructions, commands and other routines in support of the processes described herein. For instance, the system controller 148 may include one or more processors and be configured to execute instructions of vehicle application 228 to provide features such as wireless communication and power management. Such instructions and other data may be maintained in a non-volatile manner using a variety of computer-readable storage medium 226. The computer-readable medium 226 (also referred to as a processor-readable medium or storage) may include any non-transitory medium (e.g. tangible medium) that participates in providing instructions or other data that may be used by the system controller 148. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and structured query language (SQL).

The vehicle 112 may further be provided with navigation and route planning features through a navigation controller 224 configured to calculate navigation routes responsive to user input via, for example, HMI controls (not shown) and output planned routes and instructions via an output device such as a speaker or a display (not shown). Location data that is needed for navigation may be collected from a global navigation satellite system (GNSS) controller 216 configured to communicate with multiple satellites and calculate the location of the vehicle 112. The GNSS controller 216 may be configured to support various current and/or future global or regional location systems such as global positioning system (GPS), Galileo, Beidou, Global Navigation Satellite System (GLONASS) and the like. Map data used for route planning may be stored in the storage 226 as a part of the vehicle data 230. Navigation software may be stored in the storage 226 as a part of the vehicle applications 228.

The vehicle 112 may be further configured to wirelessly communicate with a variety of digital entities via a wireless transceiver 214. For instance, the vehicle 112 may be configured to communicate with the HEE controllers 209, 212 (local or remote) via the wireless transceiver 214 to perform various operations. Additionally or alternatively, the communication between the vehicle 112 and the HEE controller may be enabled by the EVSE connector 140 coupled with the charge port 134 configured to support digital communication protocols. The wireless transceiver 214 of the vehicle 112 may be further configured to communicate with a compatible transceiver of another vehicle (not shown) associated with the HEE 200. Additionally or alternatively, the communication between the vehicles may be enabled by a wired connection such as via the EVSE 138 configured to support digital communication protocols. The wireless transceiver 214 may be configured to support a variety of wireless communication protocols enabled by wireless controllers (not shown) in communication with the wireless transceiver 214. As a few non-limiting examples, the wireless controllers may include a Wi-Fi controller, a Bluetooth controller, a radio-frequency identification (RFID) controller, a near-field communication (NFC) controller, and other devices such as a Zigbee transceiver, an IrDA transceiver, an ultra-wide band (UWB) transceiver, or the like. For instance, the vehicle 112 may connect to a Wi-Fi router of the house to access the cloud server 232.

The vehicle 112 may be further provided with a telematics control unit (TCU) 218 configured to control telecommunication between the vehicle 112 and the cloud 232 through a wireless connection 236 using a modem 220. The wireless connection 236 may be in the form of various communication networks (e.g. cellular network). Through the wireless connection 236, the vehicle 112 may access one or more servers of the cloud 232 to access various content for various purposes. The various components of the vehicle 112 introduced above may be connected to each other via in-vehicle network 238. The in-vehicle network 238 may include, but is not limited to, one or more of a controller area network (CAN), an Ethernet network, and a media-oriented system transport (MOST), as some examples.

The HEE controllers 209, 212 may be configured to control and coordinate the energy distribution of the house 202 based on various factors. For instance, due to the operational nature of the solar panel 211, electricity may only be generated during daytime with sufficient sunlight. The HEE controllers 209, 212 may anticipate and determine the amount of electric power to be generated by the solar panel 211 using weather report information indicative of the time and condition of the sunlight to coordinate a power coordination process and optimize an energy profile of the household 202. The power coordination may be performed in a variety of manners. For instance, the HEE controllers 209, 212 may apply a balanced coordination strategy to evenly distribute the power generated by the solar panel 211 to multiple entities. The HEE controllers 209, 212 may evenly divide the solar power and distribute to the HES 208 and the one or more vehicles 112 (if connected). The HEE controllers 209, 212 may further distribute the solar power to the grid 204. Alternatively, the HEE controllers 209, 212 may apply a charging rate/capacity-based coordination strategy to distribute the solar power based on how fast and how much each entity may receive the electric charge. In general, the traction battery 124 of the vehicles 112 may have a higher capacity to receive charge in terms of both the speed and the capacity. Responsive to detecting the vehicle 112 is connected to the EVSE 138, the HEE controllers 209, 212 may distribute more power to the vehicle battery 124. Alternatively, the HEE controllers 209, 212 may apply a demand-based coordination strategy to distribute the solar power based on the predicted power demand from various entities. For instance, the HEE controllers 209, 212 may obtain a user schedule (e.g. from the one or more vehicles 112) to determine an upcoming trip for the vehicle and the amount of charge needed by the trip. The HEE controllers 209, 212 may further anticipate a duration during which the vehicles 112 are connected to the HEE 200 based on the user schedule as well as historical record data. The HEE controllers 209, 212 may further determine an upcoming electric equipment 210 usage based on a prior use record. Furthermore, the HEE controllers 209, 212 may receive a message from the grid 204 indicative of a peak hour demanding power output from the HEE 200 to the grid 204 at a given time. The HEE controllers 209, 212 may coordinate the solar power distribution using the above one or more power demand information accordingly. Alternatively, if both the HES 208 and the traction battery 124 are full of charge, the HEE controllers 209, 212 may supply the solar power 211 to the grid by default.

Figure 3:
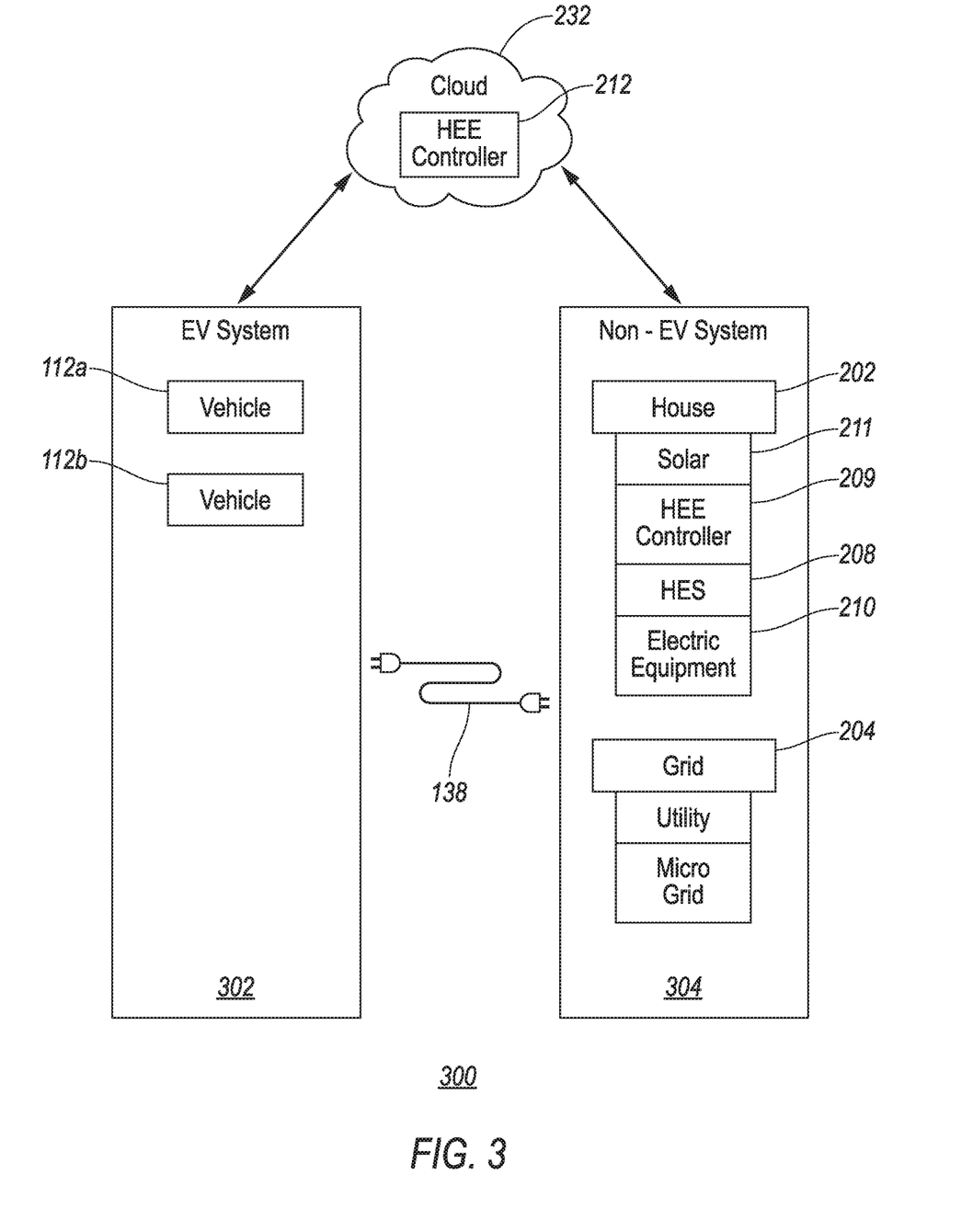
FIG. 3 is a block diagram of a centralized power coordination.
Figure 4:
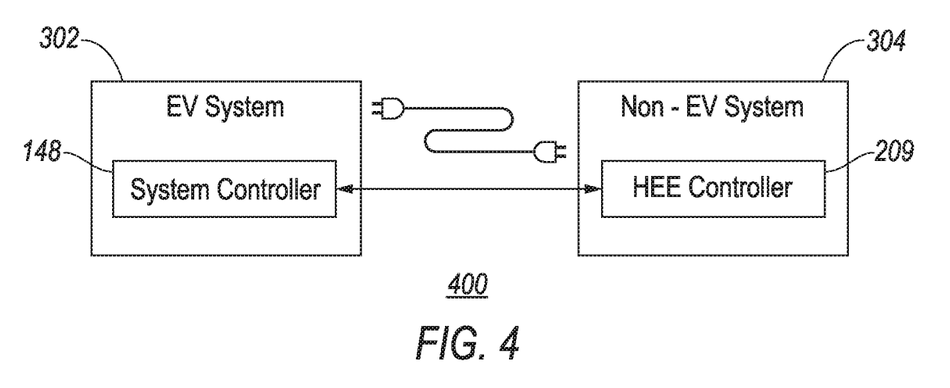
FIG. 4 is a block diagram of a distributed power coordination.
Figure 5:
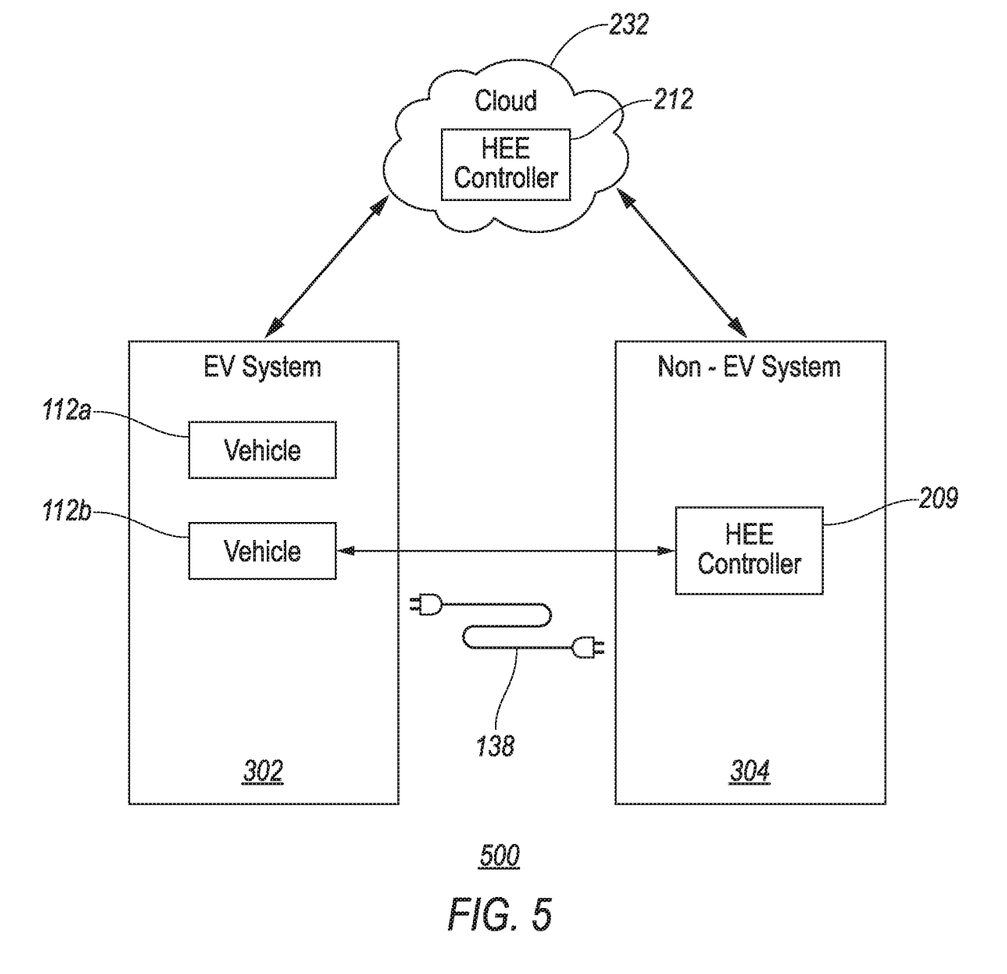
FIG. 5 is a block diagram of a hybrid power coordination.

Referring to FIG. 3, an example block diagram of a centralized power coordination system 300 is illustrated. With continuing reference to FIGS. 1 and 2, the power coordination system 300 in the present example is collectively controlled and coordinated by the remote HEE controller 212 located in the cloud 232. The power coordination system 300 may be configured to coordinate the power distribution between two major entities—an EV system 302 and a non-EV system 304. The EV system 304 may include one or more electric vehicles 112 associated with the HEE 200. The non-EV system 304 may include various non-vehicle entities that are associated with the same HEE 200. As a few non-limiting examples, the non-EV system 304 may include the house entity 202 having the solar panel 211, the local HEE controller 209, the HES 208 or the like. The non-EV system 304 may further include the grid entity 204 such as utility companies and microgrid entities. In the present example, the EV system 302 may be electrically connected to the non-EV system via a power transfer means such as the EVSE 138 to exchange power. However, EV system 302 and the non-EV system 304 may not directly exchange and share data with each other as the power coordination is performed by the cloud HEE controller 212. Data from the EV system 302 and the non-EV system 304 may be independently collected by the remote HEE controller 212 for coordination purposes. The EV system 302 may send vehicle data to the cloud 232. For instance, the remote HEE controller may collect the battery status data from one or more of the vehicles 112 connected to the HEE 200 to determine how much charge the vehicles currently have. The remote HEE controller 212 may further collect user calendar data from the vehicles 112 or entities associated with the vehicles (e.g. a user mobile device) to determine an anticipated trip and the associated time and charge. The non-EV system 304 may send data related to the house 202 to the cloud 232. For instance, the remote HEE controller 212 may collect the HES status data from the house entity 202 to determine the state of charge of the HES. The remote HEE controller 212 may collect the solar panel data from the house entity 202 or from other clouded based entities (e.g. a weather server) to determine the current and anticipated power output by the solar panel 211. The remote HEE controller 212 may further collect data regarding a current or anticipated operation of the electric equipment 210 (e.g. a dryer) to determine a power demand. The remote HEE controller 212 may further collect the grid data from various entities associated with the grid 214 to determine and anticipated grid condition and demand. Based on the data collected from both the EV system 302 and the non-EV system 304, the HEE controller 212 may generate commands and instructions for both the vehicles 112 and the house 202 to collectively coordinate the power distribution therebetween.

In the present example, the centralized power distribution system 300 requires the cloud HEE controller 212 to access sensitive and private information to entities of both the EV system 302 and the non-EV system 304. In other words, the various entities of both systems 302, 304 need to grant the access to their own sensitive data to enable the functioning of the centralized power distribution system 300. The sensitive data may include various data entries that the vehicle manufacturer and/or the user is unwilling to share with other entities. For instance, the sensitive data may include a user calendar, vehicle location history, vehicle scheduled trip, vehicle power consumption, diagnostic trouble code or the like. From the perspective of the EV system 302, this requirement is not an issue if entities (i.e. the vehicles 112) within the EV system 302 are made by the same or related manufacturers. However, if the vehicles 112 are made by different or unrelated manufacturers, such types of data access may not be available. In addition, the vehicle entities 112 and entities of the non-EV system 304 may not allow sharing the sensitive data between the systems 302, 304. In this case, a locally distributed system may be used instead.

With continuing reference to FIGS. 1 to 3, FIG. 4 illustrates an example block diagram of a distributed power coordination system 400. In contrast to the example illustrated with reference to FIG. 3, the power coordination system 400 is locally controlled without relying on the cloud HEE controller 212. The power coordination system 400 may be individually or collectively operated and controlled by one or more controllers of the EV system 302 and/or the non-EV system 304, including but not limited to the system controller 148 of the one or more vehicles 112 and/or the local HEE controller 209. If the cross-system data sharing is allowed (i.e. data privacy between the two systems 302, 304 is not an issue), the EV system 302 and the non-EV system 304 share data locally between themselves without sending data to the cloud 232 for centralized processing, although the systems 302, 304 may be connected to the cloud 232 to download data indicative of information such as weather forecast, grid demand or the like to better coordinate the power distribution of the system 400. The controllers of the two systems may cooperate and collectively determine a power distribution scheme for the various entities of the two systems 302, 304. If the cross-system data sharing is not allowed, each entity may individually output parameters indicative of a power demand to the other entities. The entity may receive input/feedback from other entities and adjust the output parameter based on the input/feedback, until parameters from the various entities converge into a result acceptable for all of the entities.

With continuing reference to FIGS. 1 to 4, FIG. 5 illustrates an example block diagram of a hybrid power coordination system 500. In the present example, the EV system and the non-EV system 304 are coordinated in a hybrid manner involving both the cloud HEE controller 212 and the local HEE controller 209. The hybrid system 500 may be applied to a situation such as the HEE controller 212 having access to sensitive data of one entity of the vehicle system 302 but not having access to sensitive data of another entity of the vehicle system 302. In the present example, the EV system 302 may include two vehicles. A first vehicle 112a allows the sharing of sensitive data, and a second vehicle 112b does not allow the sharing of sensitive data. In this case, the power distribution of the first vehicle 112a may be coordinated by the cloud HEE controller 212 and the power distribution of the second vehicle 112b may be controlled on its own or by the local HEE controller 209.

Figure 6:
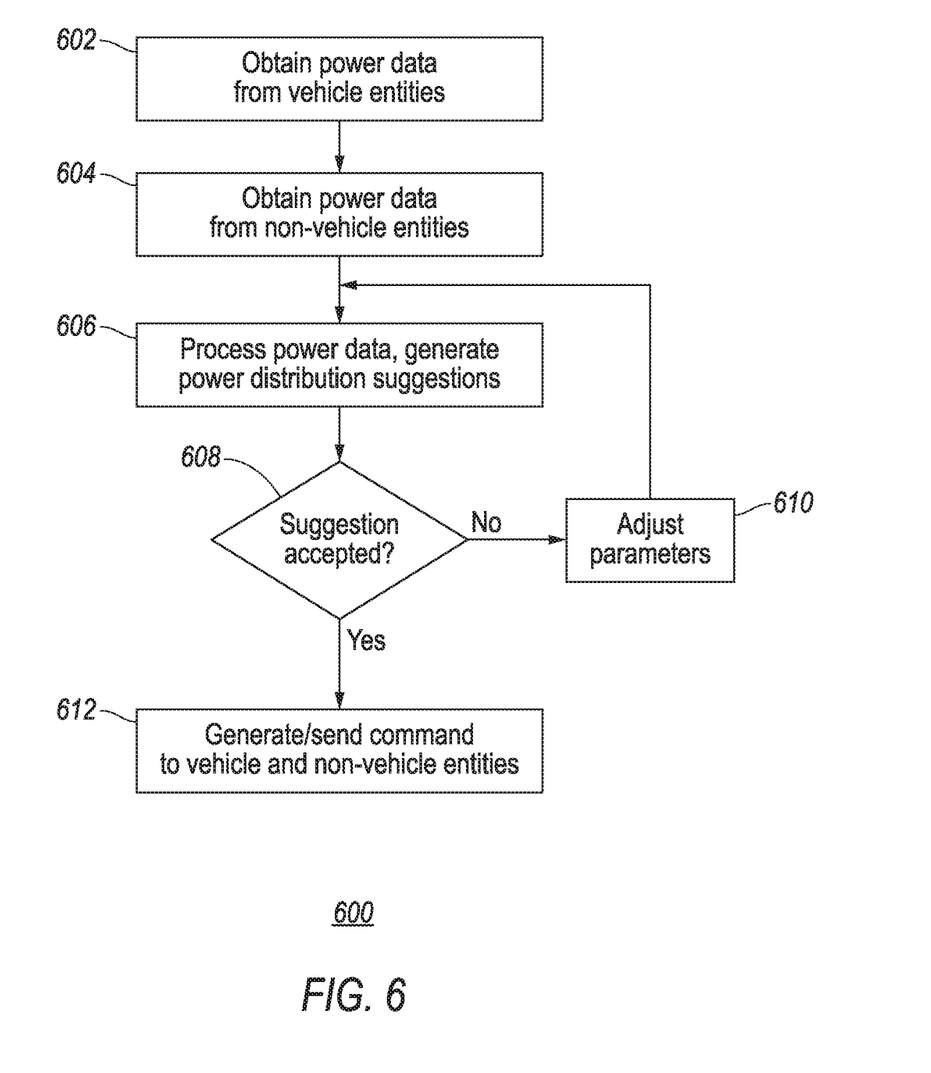
FIG. 6 is a flow diagram of a centralized power coordination process.

Referring to FIG. 6, a flow diagram for a centralized power coordination process 600 is illustrated. With continuing reference to FIGS. 1-5, the process 600 may be implemented via the cloud server 232. More specifically, the process 600 may be implemented via the HEE controller 212 located in the cloud 232 and remotely connected to the EV system 302 and the non-EV system 304. At operation 602, the remote HEE controller 212 obtains power data from one or more vehicle entities of the EV systems 302. The power data may include sensitive information associated with the respective vehicle entities as described above. The data entries of the sensitive information may be associated with one or more time frames during which the sensitive information is valid. For instance, the sensitive information may include a planned trip of the respective vehicle 112 that demands a certain amount of charge at a predetermined time in the future. At operation 604, the remote HEE controller obtains power data from entities of the non-vehicle system 304. The power data may include sensitive data associated with a time frame. For instance, the local HEE controller 209 of the house 202 may send a predicted appliance use at a given time demanding a certain amount of power and current/predicted SOC of the HES 208 to the remote HEE controller 212. The local HEE controller 209 may further send a predicted power generating event by the solar panel 211. The grid entity 204 may send a predicted power shortage or surplus to the remote HEE controller 212. The one or more power data entries may be associated with a timeframe respectively.

At operation 606, responsive to receiving the power data from both the EV system 302 and non-EV system 304, the remote HEE controller 212 processes the power data and generates power distribution suggestions to each of the entities involved. More specifically, the remote HEE controller 212 may coordinate the power distribution using the timeframes provided from each entity. The timeframes associated with each entity may be different. However, there may be overlaps in the timeframes. The remote HEE controller 212 may determine the presence of any consensus within the overlapped timeframes to suggest a coordinated operation. Further, the remote HEE controller 212 may generate the suggestions by limiting and adjusting the timeframe as well as the amount of power demand/surplus of one or more entities to better coordinate the whole system. The suggestions may be sent to each entity involved for approval. At operation 608, responsive to receiving feedback indicative of one or more entities failing to approve/accept the suggestions, the process proceeds to operation 610 to further adjust parameters of the coordination. The feedback as received from the entities may include further clarifications regarding the details of the disapproval. For instance, the feedback may include information indicative of the reasons for which the respective entity cannot approve the suggestions (e.g. the suggested timeframe is unacceptable, the suggested charging power is too low, or the like). The feedback may further include counter-suggestions to address those reasons. Based on the feedback, the remote HEE controller 212 may adjust the calibration parameters and generate revised suggestions for the entities at operation 606. If the suggestions are approved, the process proceeds to operation 612 and the remote HEE controller 212 generates coordination commands for the entities to implement the power coordination and send the commands to the entities.

Figure 7:
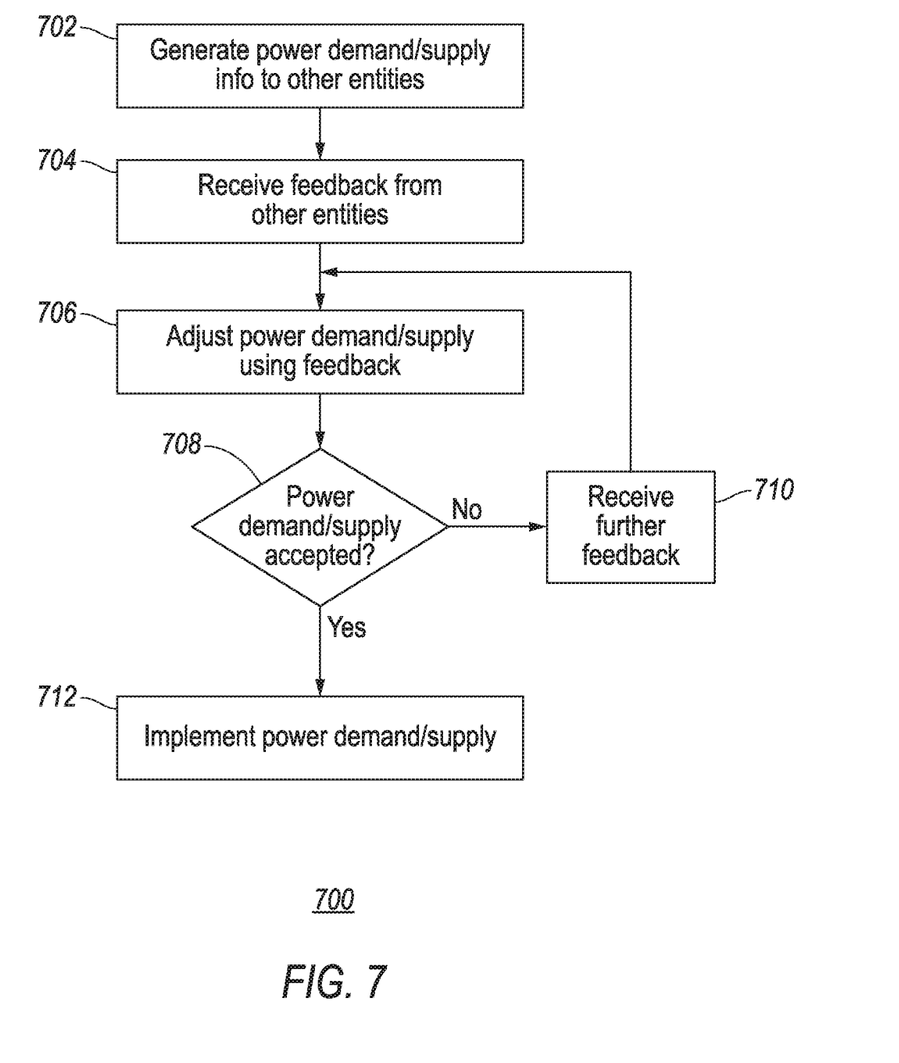
FIG. 7 is a flow diagram of a distributed power coordination process.

Referring to FIG. 7, an example flow diagram for a distributed power coordination process 700 is illustrated. In contrast to the process 600 illustrated with reference to FIG. 6, the process 700 in the present example is directed to coordinating the power distribution in a distributed manner without involving the cloud HEE controller 212. With continuing reference to FIGS. 1-5, the process 700 may be directed to either an entity of the EV system 302 (e.g. a vehicle 112) or an entity of the non-EV system 304 (e.g. the house 202). For simplicity purposes, the following description will be made from the perspective of the EV system 302 with reference to the system controller 148 of the vehicle 112. At operation 702, the system controller 148 generates power data to share to the corresponding non-EV entity such as the local HEE controller 209. The power data may be indicative of a power demand/supply associated with a timeframe. For instance, the system controller 148 may send a charge demand at predicted time (e.g. 80% SOC at 7 AM tomorrow) to the local HEE controller 209. Alternatively, the system controller 148 may send a charge supply information indicative of a charge surplus within the timeframe to the HEE controller 209. In the present example, the vehicle 112 does not share any sensitive data with the corresponding non-EV entity. At operation 704, the system controller 148 receives feedback from the corresponding entity similar to the feedback discussed above with reference to operation 608. Based on the feedback, the system controller 148 adjusts the power demand/supply plan at operation 706. At operation 708, if the adjusted power demand/supply plan is still not accepted by the corresponding entity, the process proceeds to operation 710 and the system controller 148 further adjusts the power demand/supply until a convergence has been met. Otherwise, if the power demand/supply plan is accepted by the corresponding entity, the process proceeds to operation 712 and the vehicle 112 implements the power demand/supply plan by charging the traction battery 124 or discharging the battery 124 to supply power to the house 202.

The operations of the processes 600 and 700 may be applied to various situations. For instance, with reference to system 500 in FIG. 5, the house 200 may be associated with two vehicles 112a, 112b. The remote HEE controller 212 may obtain sensitive data from the first vehicle 112a and the local HEE controller 209 to partially coordinate the power distribution in a centralized manner and the second vehicle 112b may communicate with the local HEE controller 209 to coordinate the power in a distributed manner. For instance, the current time is 6 PM and the first vehicle 112a demands the battery to be at least 80% charged at 7 AM the next day due to a planned trip. The second vehicle has no driving plan for the next 24 hours and may supply the power to the non-EV entities during this timeframe. The house 202 anticipates a certain amount solar power the next day from 7 AM to 6 PM due to the sunny weather. In this example, peak demand hours are 6 PM to 9 PM for power supply from available entities for credits and off-peak demand hours are 11 PM to 5 AM. In this case, the second vehicle 112b may coordinate with the grid 204 to supply power from its battery 124 to the grid during the peak hours and coordinate with the house 202 to only charge the battery 124 using the solar power the next day because no trip is planned until evening time the next day. For the first vehicle 112a, the remote HEE controller 212 may coordinate the power distribution by suggesting the vehicle to discharge during the peak hours and charge the battery 124 during off-peak hours. The first vehicle 112a may accept the suggestion or alternatively reject the power supply suggestion. In this case, the first vehicle 112a may charge the battery 124 during the off-peak hours such that the 80% SOC battery demand may be met the next morning. The local HEE controller 209 may coordinate to discharge the HES 208 to supply power to the grid 204 and recharge the HES 208 during the off-peak hours.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A server comprising:
one or more controllers programmed to
communicate with a local controller configured to coordinate energy distribution of a plurality of entities associated with a building,
receive data from a first vehicle at a location of the building, and receive data from the local controller about a second vehicle that is at the location and not in communication with the one or more controllers, wherein the data from the first vehicle includes a schedule of use of the first vehicle for a predefined period of time that encompasses the specified time,
responsive to a request from the first vehicle to receive a predefined amount of charge power by a specified time, query the first vehicle regarding whether the first vehicle will accept an amount of charge power less than the predefined amount by the specified time, and
command a grid and the local controller to each supply charge power to the first vehicle based on the data from the first vehicle and the data from the local controller such that the first vehicle receives the amount of charge power less than the predefined amount by the specified time from the grid and at least one of the energy storage units associated with the building.

2. The server of claim 1, wherein the one or more controllers are further programmed to command the grid and the local controller to each supply charge power responsive to confirmation from the first vehicle that the first vehicle will accept the amount of charge power less than the predefined amount by the specified time.

3. The server of claim 1, wherein the one or more controllers are further programmed to, responsive to indication of the first vehicle having an amount of stored power that is greater than an amount of power needed to satisfy power demand of the first vehicle over a predefined period of time, command the first vehicle to discharge at least some of the stored power to the grid, and command the local controller to subsequently charge the first vehicle with power renewably generated at the location such that the first vehicle stores the amount of power needed to satisfy the power demand before the predefined period of time.

4. The server of claim 1, wherein the data from the local controller includes information associated with a request for power from the second vehicle.

5. The server of claim 1, wherein the one or more controllers are further programmed to command the grid to supply charge power to the first vehicle based on the data from the first vehicle and the data from the local controller such that the first vehicle receives the amount of charge power less than the predefined amount by the specified time.

6. The server of claim 1, wherein the one or more controllers are further programmed to command the local controller to supply charge power to the first vehicle based on the data from the first vehicle and the data from the local controller such that the first vehicle receives the amount of charge power less than the predefined amount by the specified time.

7. A server comprising:
one or more controllers programmed to,
responsive to indication of a first vehicle at a location having an amount of stored power that is greater than an amount of power needed to satisfy power demand of the first vehicle over a predefined period of time, command the first vehicle to discharge at least some of the stored power to a grid, and command a local controller at the location to subsequently charge the first vehicle with power renewably generated at the location based on data about anticipated use of the first vehicle and weather data at the location for the predefined period of time such that the first vehicle stores the amount of power needed to satisfy the power demand before the predefined period of time,
wherein the data about anticipated use of the first vehicle includes a schedule of use of the first vehicle for the predefined period of time,
wherein the local controller is configured to coordinate energy distribution of a plurality of energy storage units associated with the location.

8. The server of claim 7, wherein the one or more controllers are further programmed to receive data from the local controller about a second vehicle that is at the location and not in communication with the one or more controllers, responsive to a request from the first vehicle to receive a predefined amount of charge power by a specified time, query the first vehicle regarding whether the first vehicle will accept an amount of charge power less than the predefined amount by the specified time, and command at least one of the grid or the local controller to supply charge power to the first vehicle based on the data about anticipated use of the first vehicle and the data from the local controller such that the first vehicle receives the amount of charge power less than the predefined amount by the specified time.

9. The server of claim 8, wherein the one or more controllers are further programmed to command at least one of the grid or the local controller to supply charge power responsive to confirmation from the first vehicle that the first vehicle will accept the amount of charge power less than the predefined amount by the specified time.

10. The server of claim 8, wherein the data from the local controller includes information associated with a request for power from the second vehicle.

11. A home energy system comprising:
a local controller programmed to
access data from a first vehicle at a location describing a schedule of use of the first vehicle for a predefined period of time, and
responsive to a request from a second vehicle at the location to receive an amount of charge power by a specified time while data from the second vehicle describing a scheduled use of the second vehicle for the predefined period of time is unavailable to the local controller,
communicate with a remote server and command at least one of a grid or a local energy storage other than the first vehicle at the location to provide the amount of charge power to the second vehicle by the specified time based on the request without violating the schedule of use of the first vehicle,
wherein the remote server specifies to the local controller which of the grid or the local energy storage or both is to provide the amount of charge power.

12. The home energy system of claim 11, wherein the local controller is further programmed to command the first vehicle to discharge stored energy to at least one of the grid or the local energy storage, wherein the local energy storage is configured to store energy for the home energy system.

13. The home energy system of claim 11, wherein the local controller is further programmed to charge at least one of the first or second vehicles with power renewably generated at the location.

14. The home energy system of claim 11, wherein the local controller is further programmed to receive and execute commands from a remote server.

15. The home energy system of claim 14, wherein the local controller is further programmed to provide an amount of charge power to the first vehicle responsive to a command from the remote server specifying the amount.

* * * * *